United States Patent
Yi et al.

(10) Patent No.: US 6,606,372 B2
(45) Date of Patent: Aug. 12, 2003

(54) SYSTEM AND METHOD OF TESTING AN IDSL COMMUNICATIONS LINE

(75) Inventors: Cory Yi, Ventura, CA (US); Roy Soto, Moorpark, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/870,120

(22) Filed: May 30, 2001

(65) Prior Publication Data

US 2002/0181664 A1 Dec. 5, 2002

(51) Int. Cl.[7] .................................................. H04M 1/24
(52) U.S. Cl. .................. 379/1.04; 379/27.01; 379/4; 379/27.04
(58) Field of Search ................... 379/1.04, 4, 27.01, 379/27.04, 29.11; 370/243, 244

(56) References Cited

U.S. PATENT DOCUMENTS

| | | | | |
|---|---|---|---|---|
| 5,010,544 A | * | 4/1991 | Chang et al. ................ | 370/243 |
| 5,513,171 A | | 4/1996 | Ludwiczak et al. ........... | 370/13 |
| 5,737,319 A | | 4/1998 | Croslin et al. ............... | 370/255 |
| 5,784,558 A | * | 7/1998 | Emerson et al. ............. | 370/249 |
| 6,130,879 A | | 10/2000 | Liu ............................ | 370/230 |
| 6,163,594 A | | 12/2000 | Kennedy et al. .............. | 379/21 |
| 6,185,191 B1 | | 2/2001 | Dipperstein ................. | 370/249 |
| 6,215,854 B1 | | 4/2001 | Walance ..................... | 379/21 |

* cited by examiner

*Primary Examiner*—Curtis Kuntz
*Assistant Examiner*—Barry W Taylor
(74) *Attorney, Agent, or Firm*—Allen, Dyer, Doppelt, Milbrath & Gilchrist, P.A.

(57) ABSTRACT

A method and system is disclosed for testing an IDSL communications line. Transmission elements are queried sequentially within an IDSL communications line. A predetermined period of time is waited after querying a transmission element for a correct response. If a correct response is received, the next transmission element is queried for its existence. Configuration of the IDSL communications line is identified based on the received responses.

25 Claims, 2 Drawing Sheets

SYSTEM AND METHOD OF TESTING AN IDSL COMMUNICATIONS LINE

FIELD OF THE INVENTION

This invention relates to the testing of switched digital service communications lines, and more particularly, this invention relates to a system and method of testing an IDSL communications line.

BACKGROUND OF THE INVENTION

The rise of the internet has created a demand for higher speed internet access from residents, using the standard copper wire pairs in end-user-owned loops, such as in campus environments and high-rise buildings. The existing copper wire local loops have been designed for voice telephone using twisted pair wiring. The bandwidth in many of these copper wire local loops often are limited by bridge taps and wire gauge changes. To provide high-speed internet access across the copper wire, it was necessary to provide an economical way to increase the bandwidth along the existing twisted pair copper wires.

Digital subscriber line (DSL) technology provides the technology that improves the bandwidth of existing communication lines along the standard copper local loop. The type of DSL service that can be used depends on the distance of a premises from the central office, the type of bridged circuits, and the use of digital loop carriers (DLC). Some telephone companies installed digital loop carrier frames around existing wire centers, particularly in high growth areas to provide newer lines. Any concentrators are digital, and include fiber optic technology. They were designed before the advent of digital subscriber line technology and do not support this technology.

A digital loop carrier, on the other hand, supports integrated services digital network (ISDN) technology, using a high-quality switched digital service to the premises. In a basic rate interface (BRI), two bearer (B) channels of 64 Kbps each, and a 16 Kbps signaling (D) channel are operative to provide up to 128 kilobits per second of data along the existing copper wire local loop to provide digital voice and data channels.

Problems often develop with providing DSL not only with a digital loop carrier, but also along communication lines that are spaced a great distance from the central office. Therefore, a new service well known as ISDN DSL (IDSL) operates at speeds of about 128 Kbps. Although these speeds are less than speeds offered by most other digital subscriber line technologies, IDSL provides for access over the twisted pair copper wires used for single-line voice telephone service. IDSL acts as a dedicated service as a data only service, lacking an analog voice line that other digital subscriber loop technologies offer, such as asymmetric digital subscriber loop technologies (ADSL). An IDSL line can pull traffic that otherwise would tie up a voice switch and drop it onto a frame relay network to handle virtual circuits.

The IDSL circuits use IDSN transmission coding, bundling together both ISDN channels and voice all on one circuit. Because of this, different types of tests common for XDSL technologies, such as a multi-meter test and wideband loop performance test, cannot be operative past the first digital loop controller in a typical IDSL circuit. It is necessary to confirm circuit operation downstream of the digital loop carrier to provide critical information to speed up deployment and maintenance of IDSL communication lines. There are some known communication and test sets, such as disclosed in U.S. Pat. No. 6,185,191 to Dipperstein; U.S. Pat. No. 6,215,854 to Walance; and U.S. Pat. No. 6,163,594 to Kennedy et al. Although these units are operative for testing ISDN transmission coding, they do not provide for adequate ISDL testing.

SUMMARY OF THE INVENTION

It is therefore an object of the present invention to provide a method and system of testing an IDSL communications line to identify the configuration of the IDSL communications line.

It is yet another object of the present invention to provide a method and system of testing an IDSL communications line that overcomes the drawbacks as noted above.

The present invention is advantageous and provides a method and system of testing an IDSL communications line. Transmission elements are queried sequentially within the IDSL communications line. A predetermined period of time is waited after querying a transmission element to receive a correct response. If a correct response is received, the next transmission element is queried for its existence. The configuration of the IDSL communications line is identified based on the received responses.

In yet another aspect of the present invention, the transmission elements are queried by using an auxiliary IDSL channel, such as an embedded operations channel. The network terminator can be detected, which is considered as the last element in the communications line. The step of waiting for a correct response can include the step of waiting for a correct embedded operations channel message. If a correct response is not received within a predetermined period of time, then the last network element is considered as identified. A correct response can be received after a predetermined period of time, and the next sequential transmission element is queried for its existence. The step of querying the next sequential transmission element can occur only when the number does not exceed six transmission elements. The step of periodically querying the last transmission element located within the IDSL communications line can determine any changes within the configuration of the IDSL communications line. The transmission elements can comprise repeaters, while the communications line comprises a twisted pair copper wire as part of the local loop.

A test set for testing an IDSL communications line is also disclosed and includes an interface circuit for interfacing with an IDSL communications line. A processor is connected to the interface circuit and transmits a query command along the IDSL communications line and queries transmission elements sequentially along the communications line and identifies the configuration of the IDSL communications line based on the received responses. The processor and interface circuit can be operative for transmitting the query command along an auxiliary IDSL channel, such as an embedded operations channel. The transmission elements can comprise signal repeaters.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and now provides a dynamic intermediate element counter that is advantageous over normal multi-meter testing and wideband loop performance tests that cannot signal and see past the first digital loop carrier in a typical IDSL circuit. The present invention confirms circuit operation downstream of a digital loop carrier and provides critical information to speed up deployment and maintenance of IDSL lines.

Figure 1:
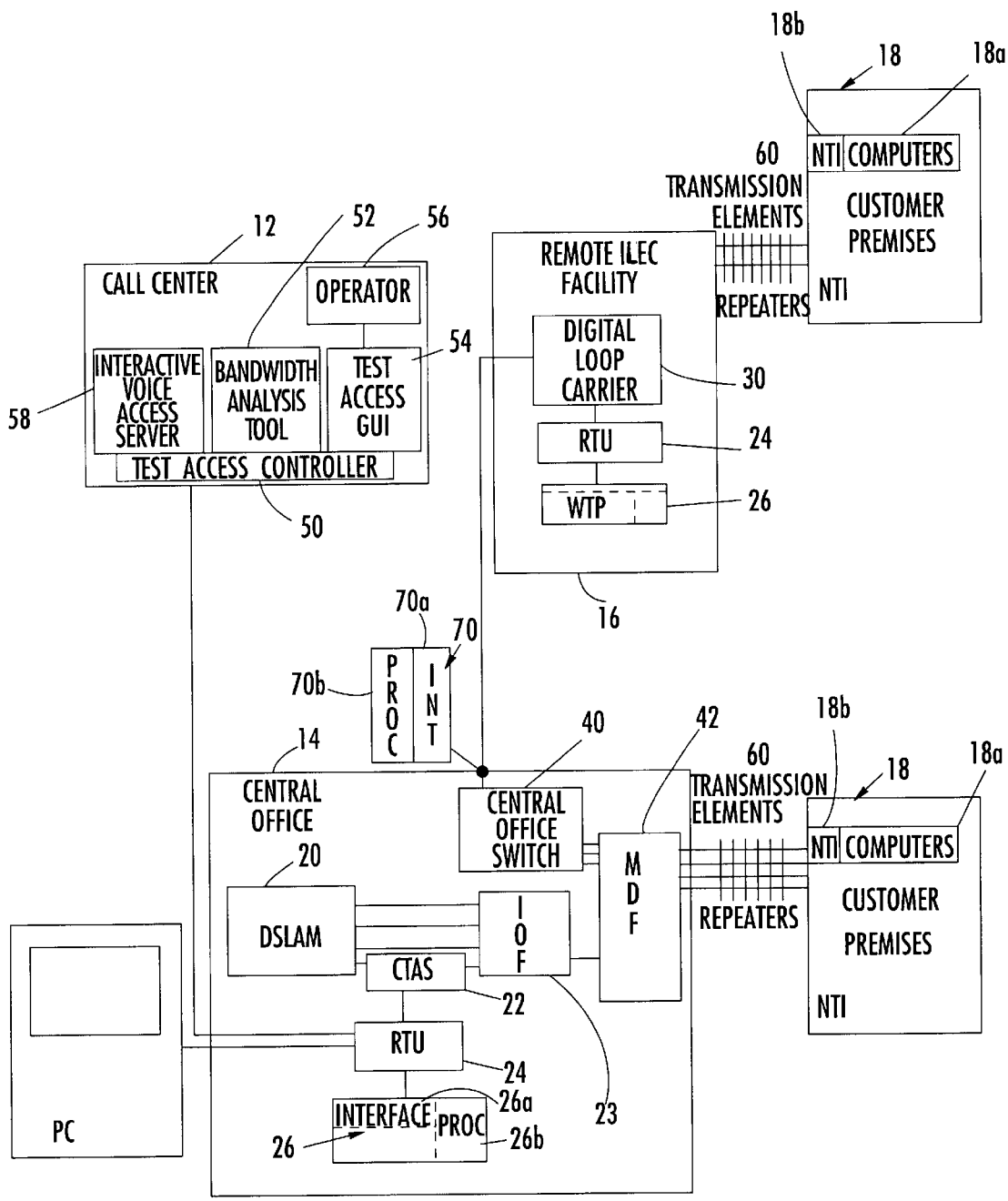
FIG. 1 is a high level block diagram of a typical network element interconnection using the test sets and can be used with the method of the present invention.

For purposes of understanding, a high level block diagram of a communications network 10 and the various components that could be used to operate the system and method of the present invention is shown in FIG. 1. A call center 12, central office 14, remote ILEC facility 16 and two customer premises 18 are disclosed. It should be understood that many different network elements are possible to be used with the present invention. It should be understood that IDSL communications lines are a merger of the integrated system digital network (ISDN) allowing the high-quality, ubiquitous switched digital service that uses digital loop carrier technology for the high-speed data service, even with long distances and the use of a digital loop carrier. IDSL uses ISDN transmission coding, and bundles together both the ISDN channels and voice on one circuit. As known to those skilled in the art, IDSL does not use a dial-up or involve a per-call fee.

As shown in FIG. 1, the central office 14 includes a digital subscriber line access multiplexer (DSLAM) 20 connected to a carrier test access switch (CTAS) circuit 22 that can be used to test a local loop. The CTAS 22 sits in-line between the line equipment, such as the DSLAM 20 and the end user equipment, such as a DSL modem. It is shown connected in-line between the DSLAM 20 and an intermediate distribution frame 23. A remote test unit (RTU) 24 and wideband test pack (WTP) 26 both connect to the carrier test access switch 22. The remote test unit 24 acts as an intelligent test head to perform tests on the copper wire loop. It operates as a rugged device for use in a central office and digital loop controller environments to provide single-ended and interactive multi-meter loop test capability. An example of a remote test unit 24 is a model 107 A/F as manufactured by Harris Corporation. The wideband test pack (WTP) 26 includes an interface circuit 26a and processor 26b. An example of a WTP includes an ISDN test package as part of its component circuits, such as manufactured by Harris Corporation of Melbourne, Fla. The WTU can measure and receive high frequency tones and analyze DSL and IDSL lines. A PC 27 is connected to the RTU 24, for test signaling interface, as known to those skilled in the art.

As shown also in FIG. 1, a remote incumbent local exchange carrier (ILEC) includes a digital loop carrier (DLC) 30 with a connected remote test unit 24 and wideband test pack 26. The remote test unit 24 is operative with the wideband test pack 26 to expand test capabilities at higher frequencies and measure these high frequencies by sending high frequency test tones and locating bridge taps. The digital loop carrier 30 is connected to the central office switch 40, which is connected to a main distribution frame 42. The Digital Subscriber Line Access Multiplexer 20 is connected to an Intermediate Distribution Frame 24, all known to those skilled in the art.

The call center 12 is operatively connected to the Remote Test Unit 24 and operative with a Test Access Controller 50, Bandwidth Analysis Tool 52, Test Access Graphical User Interface 54 for use by a call enter operator 56, and Interactive Voice Access Server 58, components manufactured by Harris Corporation of Melbourne, Fla. Other transmission elements 60 can include repeaters 60 that connect to the remote ILEC facility 16 and to the main distribution frame 14.

Transmission elements 60 like repeaters can be located at different points as known to those skilled in the art. Computers 18a are located at a customer premises 18. The customer premises 18 includes a network terminator (NTI) 18b, which is connected into the copper local loop. A separate ISDN modified test set 70 is shown connected in the network line at the central office 40, and includes an interface circuit 70a and processor 70b for testing the line by techniques known to those skilled in the art.

Figure 2:
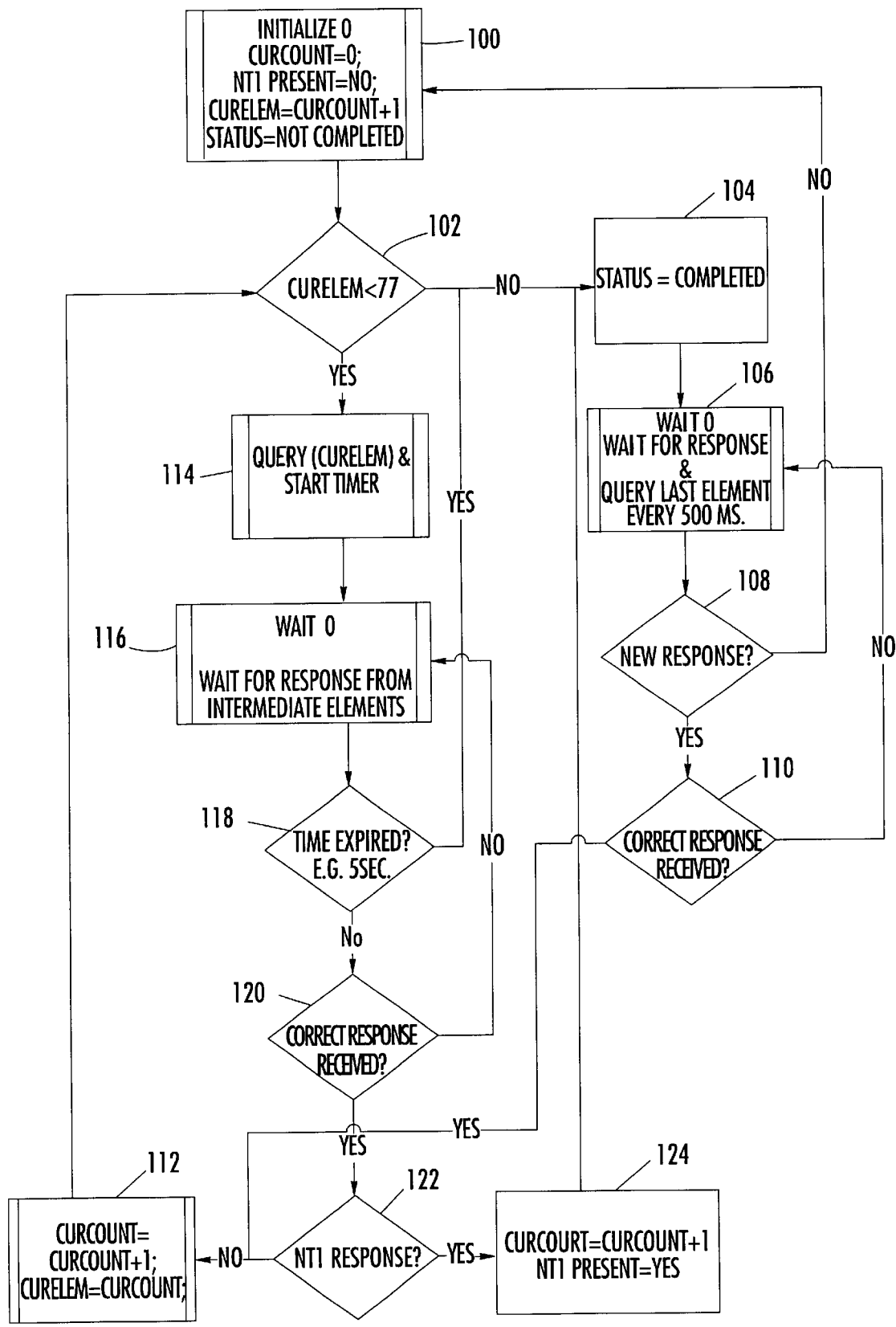
FIG. 2 is a flow chart illustrating the various steps in the algorithm of the present invention, as a non-limiting example.

Referring now to FIG. 2, there is illustrated a flow chart of one example of the algorithm used in the present invention. As shown in block 100, a processor of a test set, wideband test pack, or other device for testing the line is initialized and a current count set to zero. Because the algorithm and testing is beginning, the network terminator (NT1) is not considered present and equals no. The current element equals the current count, which is zero, plus one for the test of the first transmission element. Naturally, the status is not completed.

In accordance with one aspect of the invention, the algorithm determines if the current transmission element is less than seven (block 102). The algorithm works in this aspect of the invention with a maximum of six transmission elements, including the network terminator. If current transmission elements are less than seven (7), i.e., yes, then it continues with the algorithm because the system has found all the transmission elements. If not, i.e., no, then status is completed (block 104) and the algorithm and test set moves into an idle mode, as shown on the right-hand side of the algorithm. At this time, the testing device can wait for a response to determine if there is any type of change in the environment (block 106). For example, if element 3, such as a network repeater, is pulled out or if there is a short, then the algorithm determines it to be the last element because the connection would not present. Thus, the algorithm is in a wait for response mode and queries the last element every 500 milliseconds.

The query is performed and the algorithm determines if there is a new response (block 108). If there is no response back in a period of time, i.e., no, then there is a change in the environment and a loop back occurs to the beginning at 100. If there is a new response, the algorithm determines if correct response is received (block 110). If a correct response is not obtained, such as through the auxiliary channel, e.g., an embedded operations channel, and received within the time window, the system is normal. As noted before, if no new response is received at block 108, then the loop back occurs back to the beginning at the initializing where the current count equals zero. There is no network terminator, and the current element is the current count plus one. If the new response had been received and the correct response had not been received within the predetermined period of time (block 110), then the loop back occurs with a wait for response in the query of the last element every 500 milliseconds.

If the correct response is received, then the current count equals the current count plus one (block 112) and the current element equals the current count. A loop back occurs to the beginning of the process, and the algorithm determines if current elements are less than seven (block 102). if yes, the current network element is queried and a timer begun (block 114) (as in the left side of the column). For example, the system will begin with the current element of one and check to determine if the first element is located and present. The timer begins with a time-out of five seconds. The system waits for a response from intermediate elements (block 116), such as network repeaters.

If the time is expired (block 118), for example, and more than five seconds pass before a response from intermediate elements, then the loop back occurs to where status is completed at block 10. If no response is received back from a particular communications transmission element, then the system assumes that it has completed the search and determine if the response that is obtained back is the correct format from the embedded operations channel or other auxiliary channel for the response (block 120). If the correct response is received, then the system will determine whether the response is from the network terminator (block 122), and if it is, then the search is done because the last network element located is the network terminator. The current count will be incremented by one and the status completed at block 124.

The last transmission element as the network terminator (NT1) will continue to be queried to determine status changes and changes in any IDSL configuration. If there is no network terminator response, then there could be more transmission elements and the loop back occurs to compare the current network element to determine if it has exceeded the maximum allowable elements. If it is less than seven, it will go through the whole sequence once again.

The invention as a method can be embodied in a software algorithm as part of a testing device, which counts intermediate transmission elements in the IDSL circuit via embedded operations channel, as an example. Any changes in the current configuration of the IDSL circuit from the initial reading is dynamically updated in real time. In the algorithm as an example, there cannot be more than six intermediate transmission elements in an IDSL circuit, which may or may not include an NT1. If detected, it is considered the last network element in an IDSL circuit and the configuration is identified. This number can change depending on the software and other aspects.

Each intermediate transmission network element is queried for its existence sequentially and the time required to receive the correct response from the last queried network element is considered indefinite. The software will allow a five seconds time window for each transmission element in an IDSL circuit to respond with the correct embedded operations channel message. If the correct response message is received within the time allowed, and the next element is less than six, the next element is queried for its existence. If no response has been received within the time allowed, the last element in the IDSL circuit is considered identified. It is possible, however, to receive the correct response from the last queried element after the five seconds time expiration. If this happens, the element count is incremented and continues to query the next element in the circuit if it is appropriate.

Once the IDSL circuit has been identified (i.e., either the five second time expired or NT1 detected), the software periodically queries the last element found for any changes in the IDSL circuit configuration. To summarize the real advantage of this invention, the NT1 need not be present in order to read the correct configuration of the network, and the information is provided in real-time. For example, the TS250 hand-held ISDN test set as manufactured by Harris Corporation, gives a current snapshot of a network configuration on demand. However, it does not report correct count if an NT1 is not present. This can lead to incorrect intermediate element count if there is no NT1 present since the last element in the configuration may still be in a state where it is trying to establish the super frame sync with network. With the present invention, however, any changes in the network configuration will be reported dynamically leaving no room for incorrect reading of the current network configuration. The present invention could advantageously be used with an enhanced TS250 test kit with added components for IDSL line testing.

The wideband test set that can be used with the present invention as manufactured by Harris Corporation, indicated above, can include automated call-yourself BERT, and U and S/T interface testing to support line prequalification. It features 64 K and 56 k data and voice calls and on-line assist key explaining complex messages in plain English with an amplified speaker, LCD, and operates on simple four AA alkaline rechargeable batteries. As noted before, it uses embedded operations channel monitoring and FEBE/NEBE testing with one B or two B channel bit error rate testing as noted before. As the TE mode for S/T interface testing and the NT1-TE mode for U interface testing. It also includes LAPD (X.25) calls. It uses 40 kilohertz tone generation for the U interface and 96 kilohertz tone generation with the S/T interface.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of testing an IDSL communications line comprising the steps of:

querying transmission elements sequentially by a test set within an IDSL communications line and sending high frequency test tones and determining if a current transmission element is less than a predetermined number, and if not, moving the test set into an idle mode where the test set waits for a response and a change in environment and loop back occurs;

if the current transmission element is less than a predetermined number, waiting a predetermined period of time after querying a transmission element for a correct response;

if a correct response is received, then querying the next transmission element for its existence;

if a correct response has not been received within a predetermined period of time, considering the last network element as identified;

periodically querying the network element identified as the last network element to determine status changes such that if there is no response indicative of a network terminator, querying again to determine if the network element has exceeded a maximum allowable number of elements in the transmission line, and if not exceeded, querying periodically for status changes; and identifying and updating the configuration of the IDSL communications line based on the received responses.

2. A method according to claim 1, and further comprising the step of querying the transmission elements using an auxiliary IDSL channel.

3. A method according to claim 2, wherein the auxiliary IDSL channel comprises an embedded operations channel.

4. A method according to claim 1, and further comprising the step of detecting a network terminator and considering the network terminator as the last element in the communications line.

5. A method according to claim 1, wherein the step of waiting for a correct response comprises the step of waiting for a correct embedded operations channel message.

6. A method according to claim 1, wherein after a correct response is received after a predetermined period of time, querying the next sequential transmission element for its existence.

7. A method according to claim 6, and further comprising the step of querying the next sequential transmission element only when the number does not exceed six transmission elements.

8. A method according to claim 1, wherein the transmission elements comprise repeaters.

9. A method according to claim 1, wherein the communications line comprises a copper local loop.

10. A method of testing an IDSL communications line comprising the steps of:

querying transmission elements sequentially within an IDSL communications line by a test set within an IDSL communications line and sending high frequency test tones and determining if a current transmission element is less than a predetermined number, and if not, moving the test set into an idle mode where the test set waits for a response and a change in environment and loop back occurs;

if the current transmission element is less than a predetermined number, querying transmission elements after a predetermined period of time and if a correct response has not been received within a predetermined period of time, considering the last network element as identified as a network terminator;

periodically querying the network element identified as a network terminator to determine status changes such that if there is no response indicative of a network terminator, querying again to determine if a last network element has exceeded a maximum allowable number of elements in the transmission line, and if not exceeded, querying periodically again for status changes; and identifying and updating the configuration of the IDSL communications line based on the results from the querying steps and any received responses.

11. A method according to claim 10, and further comprising the step of querying the transmission elements using an auxiliary IDSL channel.

12. A method according to claim 10, wherein the auxiliary IDSL channel comprises an embedded operations channel.

13. A method according to claim 10, wherein after querying a transmission element, waiting a predetermined period of time for obtaining a correct response.

14. A method according to claim 10, wherein the step of waiting for a correct response comprises the step of waiting for a correct embedded operations channel message.

15. A method according to claim 10, wherein after a correct response is received after a predetermined period of time, querying the next sequential transmission element for its existence.

16. A method according to claim 10, and further comprising the step of querying the next sequential transmission element only when the number does not exceed six transmission elements.

17. A method according to claim 10, and wherein the transmission elements comprise repeaters.

18. A method according to claim 10, wherein the communications line comprises a copper local loop.

19. A test set for testing an IDSL communications line comprising:

an interface circuit for interfacing with an IDSL communications line; and a processor connected to said interface circuit for transmitting a query command as high frequency test tones along the IDSL communications line and querying transmission elements sequentially along the communications line and determining if a current transmission element is less than a predetermined number, and if not, moving the test set into an idle mode where the test set waits for a response and a change in environment and loop back occurs, and if the current transmission element is less than a predetermined number, querying transmission elements after a predetermined period of time such that if a correct response has not been received within a predetermined period of time, considering the last network element as identified, wherein said processor is operative for determining status changes such that if there is no network termination response indicative of a network terminator, querying again to determine if the network element has exceeded a maximum allowable number of elements in the transmission line, and if not exceeded, querying periodically for status changes to identify and update the configuration of the IDSL communications line based on the received responses.

20. A test set according to claim 19, wherein said processor interface circuit is operative for transmitting said query command along an auxiliary TDSL channel.

21. A test set according to claim 19, wherein said auxiliary IDSL channel comprises an embedded operations channel.

22. A test set according to claim 19, wherein said transmission elements comprise signal repeaters.

23. A system for testing an IDSL communications line comprising;

a communications line forming an IDSL communications link having a plurality of transmission elements, a copper loop and network terminator connected thereto;

a test circuit connected to said communications line for:

querying the transmission elements sequentially sending high frequency test tones and determining if a current transmission element is less than a predetermined number, and if not, moving the test set into an idle mode where the test set waits for a response and a change in environment and loop back occurs, if the current transmission element is less than a predetermined number, waiting a predetermined period of time for a correct response from a transmission element, if a correct response has not been received within a predetermined period of time, considering the last network element as identified;

periodically querying the network element identified as the last network element to determine status changes such that if there is no response indicative of a network terminator, querying again to determine when a last network element has exceeded a maximum allowable number of elements in the transmission line, and if not exceeded, querying periodically for status changes; and identifying and updating the configuration of the IDSL communications line based on the received responses.

24. A system according to claim 23, wherein said at least one network element comprises a repeater.

25. A system according to claim 23, wherein said correct response comprises an embedded operations channel message.

* * * * *